United States Patent [19]
Asmus et al.

[11] 3,974,687
[45] Aug. 17, 1976

[54] RATE CONTROL SYSTEM FOR A BRAKE TESTING APPARATUS

[75] Inventors: Carl Junior Asmus; Woodrow Christman Wickersham, both of Temple City, Calif.

[73] Assignee: Clayton Manufacturing Company, El Monte, Calif.

[22] Filed: May 6, 1975

[21] Appl. No.: 574,902

[52] U.S. Cl. .................................. 73/126; 73/132
[51] Int. Cl.² ........................................ G01L 5/28
[58] Field of Search ............. 73/132, 123, 126, 117, 73/121

[56] References Cited
UNITED STATES PATENTS 3,275,384   9/1966   Hirzel ............................. 73/121 UX
3,872,720   3/1975   Fleagle et al. ..................... 73/121

*Primary Examiner*—Jerry W. Myracle
*Attorney, Agent, or Firm*—Jackson & Jones Law Corporation

[57] ABSTRACT

A rate control system is disclosed for use in a brake testing apparatus which applies an automatically controlld force to the vehicle braking system being tested. The rate control system varies the rate of flow of hydraulic fluid displaced as the brake pedal moves on its brake application stroke, in response to the rate of increase of a feedback signal which represents the vehicle stopping force, or brake effort, measured at a vehicle wheel. Varying the rate of flow of hydraulic fluid controls the rate of application of the vehicle braking system during the test.

15 Claims, 4 Drawing Figures

RATE CONTROL SYSTEM FOR A BRAKE TESTING APPARATUS

BACKGROUND OF THE INVENTION

In a series of prior applications assigned to the assignee of this application, a system for vehicle brake testing has been disclosed, which incorporates an automatically controlled actuator for applying force to a vehicle brake system being tested, combined with means for measuring by dynamometer the vehicle stopping force, or brake effort, at the vehicle wheels resulting from the brake application force. One major purpose is to test for brake imbalance at the left and right wheels under various types of brake application procedures, such as rapid or slow, short period or longer period, brake pedal actuations. An important aspect of this general brake testing system is its universality of application to various vehicles, preferably in a convenient manner which permits relatively rapid transfer from one vehicle to the next in a vehicle brake testing station.

The series of related prior applications includes:

| SER. NO. | TITLE | INVENTOR(S) |
| --- | --- | --- |
| 382,385 now Pat. No. 3,877,299 | BRAKE PEDAL ACTUATOR | William Clayton Sr. and Edwin Lee Cline |
| 382,538 now Pat. No. 3,899,916 | RECORDER AND COMPUTER TYPE BRAKE ANALYZER AND METHOD | Edwin Lee Cline |
| 563,329 | BRAKE TESTING APPARATUS AND METHOD INCORPORATING HYDRAULIC POSITION-SENSITIVE SUBSYSTEM | Carl Jr. Asmus and Woodrow C. Wickersham |
| 567,286 | ACTUATOR UNIT FOR VEHICLE TESTING | Carl Jr. Asmus and Woodrow C. Wickersham |

Experience with the brake testing system disclosed in the listed applications has indicated a need for a rate control system which will control the rate at which actuating force is increased during application of the vehicle braking system during a test, in response to signals indicating the brake effort as measured at one or more of the vehicle wheels during the test. A suitable rate control system will meet several needs:

1. Since no two vehicles have braking systems which perform exactly alike, and they in fact tend to have widely different performance characteristics, a rate control system permits a more uniform brake application testing cycle from vehicle to vehicle.
2. Controlling the rate of brake application makes it possible to prevent "overshoot" in the test application which would make the measured results less reliable.
3. Controlling the rate of brake effort increase permits reaching a desired brake effort level in a predetermined period of time, thereby conserving total testing time while avoiding too rapid an application.
4. A major advantage of reaching the desired brake effort level in a predetermined period of time is avoidance of excessive heat build-up (or heat soak) at the brake friction surfaces prior to the test result measurements.

SUMMARY OF THE INVENTION

This invention provides a rate control system for a brake testing apparatus which combines means for generating a signal representing the rate of change of vehicle stopping effort as measured at one or more of the vehicle wheel brakes, means for comparing that signal with a desired value, and means responsive to divergencies between the signal and the desired value for causing a variation in the actuating force being applied by the testing apparatus to the vehicle braking system.

In the preferred version of the invention, braking torque signals from force transducers are taken separately from the left and right wheels as pressure is applied in the vehicle braking system; these signals are individually differentiated to convert them into rate of change signals; the two rate of change signals from the left and right wheels are compared and the higher rate of change signal is selected and transmitted to the next stage; the selected signal is then compared with both upper and lower predetermined rate of change values; and the results of the comparison are used to maintain, enlarge, or reduce the effective size of a valve passage or orifice which controls the rate of flow of fluid, preferably hydraulic fluid, displaced as the vehicle brakes are applied. This control of fluid flow creates a "closed loop" system, in which the rate of fluid flow is varied to maintain, at least within a reasonable range, the desired rate of increase of the stopping torque at the vehicle wheels developed by application of force to the brake actuating system.

DETAILED DESCRIPTION OF SPECIFIC EMBODIMENTS

Figure 1:
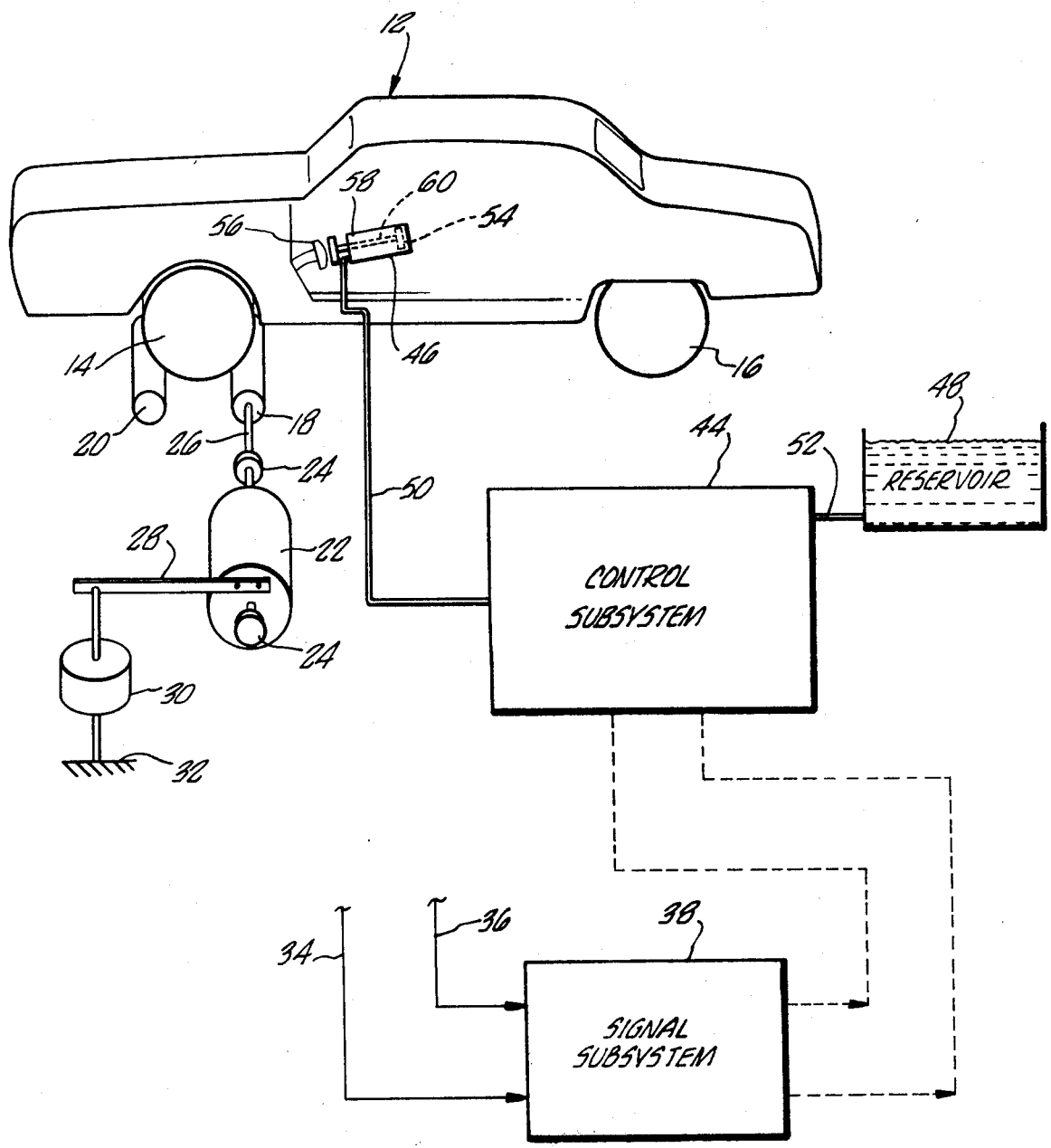
FIG. 1 is a schematic diagram showing the basic components of our closed loop control system.

FIG. 1 shows in outline a vehicle 12 having front wheels 14 and rear wheels 16. In the figure, the front wheels are shown mounted on the brake analyzer. Although only the left front wheel is seen in FIG. 1, the same arrangement is applicable to the right front wheel, since both the left and right wheels are driven by the brake analyzer during the brake testing cycle. The brakes at the two rear wheels can also be tested in the same manner on the brake analyzer.

The brake analyzer includes a vehicle test bed having two wheel supporting rollers at each wheel. The rear roller 18 is the driving roller, and the front roller 20 is an idler roller. Each of the left wheel and right wheel driving rollers 18 is driven by an electric motor 22 associated with the particular drive roller shown in the figure. Each motor 22 is supported in cradle bearings 24, so as to allow the motor housing to rotate about the center line of the motor output shaft 26. Each motor housing has a torque arm 28, one end of which rotates with the motor housing, and the other end of which is restrained by a force transducer, or load cell, 30, which is anchored at 32 to the framework of the brake analyzer apparatus. The force transducer 30 prevents the torque arm and motor housing from rotating, and also serves to measure the motor torque.

The function of the force transducer 30 at each wheel (left and right) is to develop a voltage output signal which is proportional to the input force signal from the torque arm 28. As the brakes of the vehicle are applied, the force required to rotate the vehicle wheel 14 will increase. This force, as measured at the surface of the tire, and defined as "brake effort", is directly proportional to the motor torque required to drive the rear roller 18, and is measured by the force transducer 30. The voltage output signals developed by the two force transducers 30 at the left and right wheels are transmitted by conductors 34 and 36 to a "signal subsystem" shown diagrammatically at 38 in FIG. 1, and shown in greater detail in FIG. 2. From the signal subsystem 38, two conductors 40 and 42 convey the electrical output signals to the "control subsystem" shown at 44 in FIG. 1, and shown in greater detail in FIG. 3.

The control subsystem 44 includes electrical means for responding to the signals from signal subsystem 38, and also includes a hydraulic metering device which is interposed in a hydraulic conduit between a power actuator 46 in the vehicle 12 and a hydraulic reservoir 48, the portion of the hydraulic conduit between power actuator 48 and the metering device being designated 50, and the portion of the hydraulic conduit between the metering device and the hydraulic reservoir 48 being designated 52.

The hydraulic system, which includes the power actuator 46 and the reservoir 48, is functionally the same as the hydraulic subsystem disclosed in our earlier filed application Ser. No. 563,329. As explained in that application, leftward motion of a piston 54 in the power actuator 46 causes brake actuating movement of the vehicle brake pedal 56. Pressure against piston 54 may be supplied from any suitable pressure source, such as compressed air. As the piston 54 moves toward the left, it displaces hydraulic fluid from a variable volume annular chamber 58, defined by the housing of power actuator 46, piston 54, and the force transmitting rod 60. This hydraulic fluid is displaced through conduit 50, through the metering device in the control subsystem 44, and through conduit 52 to reservoir 48. The rate at which fluid displacement from chamber 58 to reservoir 48 is permitted by the hydraulic metering device in control system 44 controls the rate at which pressure in the vehicle brake system is increased during the brake test application.

Figure 2:
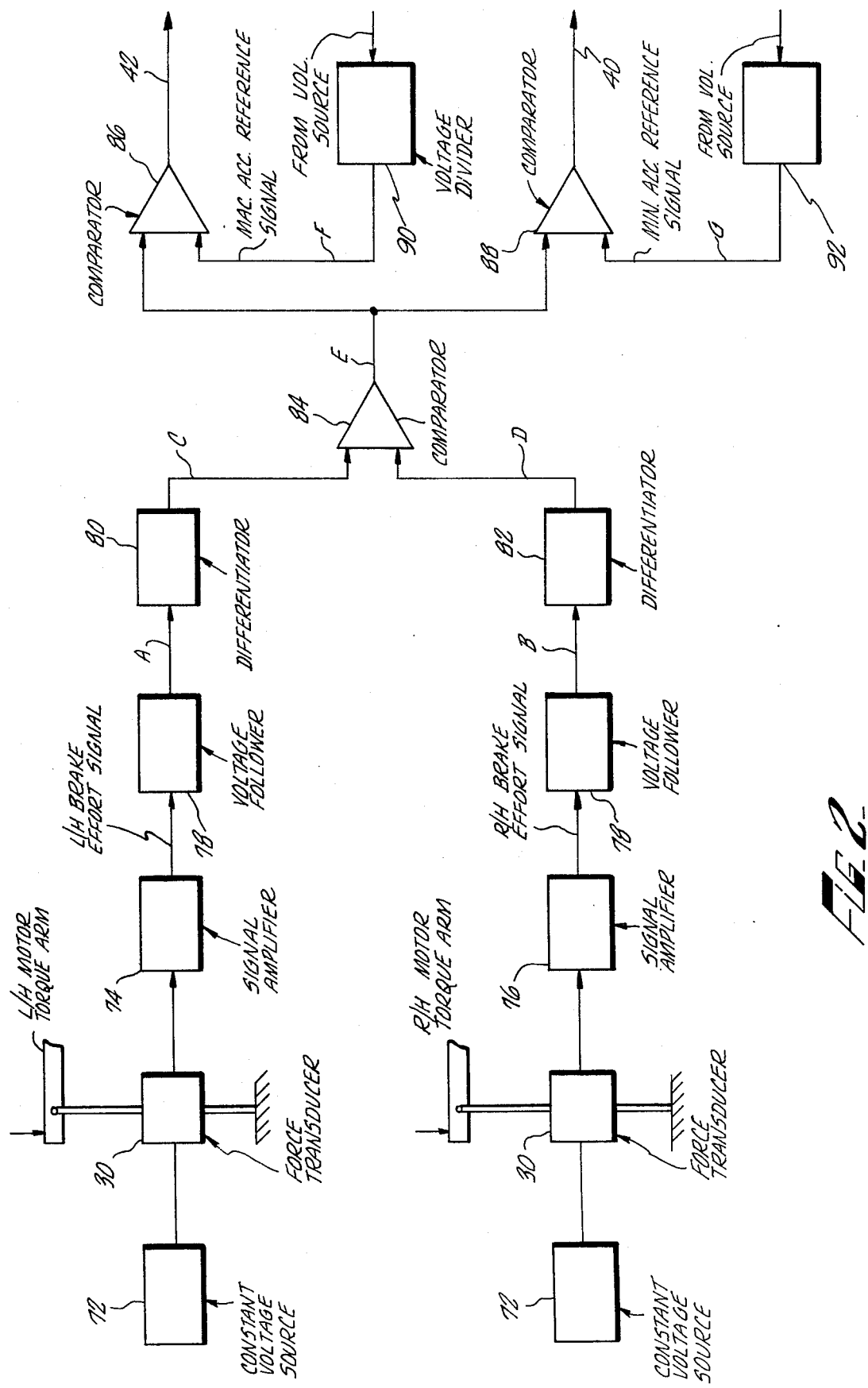
FIG. 2 is a schematic block diagram showing the electronic components of the "signal" subsystem of FIG. 1, which senses and compares the brake effort rate of change signals.

FIG. 2 shows in block diagram form the components of the signal subsystem 38. All of these components are well known electronic devices for performing the particular functions required in our rate control system. Each of the left and right force transducers 30 is connected to a constant DC voltage source 72. The left force transducer output signal representing the brake effort at the left wheel is connected to a signal amplifier 74; and the right force transducer output signal representing the brake effort at the right wheel is connected to a signal amplifier 76. The voltage signal outputs of amplifiers 74 and 76 are each fed through a separate voltage follower 78, which isolates the brake effort signals of the amplifiers 74 and 76 from the output portion of the respective circuits. This permits the brake effort signals to be used for other control functions, if desired.

The isolated brake effort signal "A" from the left amplifier 74 is the input signal to a differentiator 80; and the isolated brake effort signal "B" from the right amplifier 76 is the input signal to a differentiator 82. The purpose of the differentiators is to convert each brake effort signal into a signal indicating the rate of change of the brake effort. So the output signal "C" of differentiator 80 represents the rate of change of brake effort at the left wheel; and the output signal "D" of differentiator 82 represents the rate of change of brake effort at the right wheel.

The rate of change signals C and D are input signals to a comparator (or selector) 84. The purpose of a comparator 84 is to compare the rate of change of signals C and D, and to select, as its output signal "E", that input signal, C or D, which represents the higher rate of change of brake effort. It is usually desired to use the higher rate of change signal for control purposes. This is preferred because it is desired to complete the test as rapidly as possible while assuring that the test results will be meaningful. And this is accomplished by controlling in response to the brake having the faster rate of brake effort increase at the point when the predetermined test level is reached. If one of the brakes were to "overshoot" the appropriate test completion level of brake effort, the results would be much less useful.

It is conceivable that some brake testing situations might be adequately controlled by a signal from only one pre-selected vehicle brake, in which case a comparator would not be required, and the rate of change signal from the differentiator could go directly to the next stage, in which the rate of change signal from a vehicle brake is compared to a predetermined rate of change value, i.e., to a desired value, or range of values, of brake effort rate of change during the test.

The output signal E from comparator 84 is the input signal to two comparators (or selectors) 86 and 88. The comparator 86 compares the rate of change signal E to a maximum acceptable reference rate of change signal F. The comparator 88 compares the rate of change signal E to a minimum acceptable reference rate of change signal G. The reference signals F and G may be independently adjusted, or varied, to accommodate different testing requirements by means of voltage dividers 90 and 92.

Figure 3:
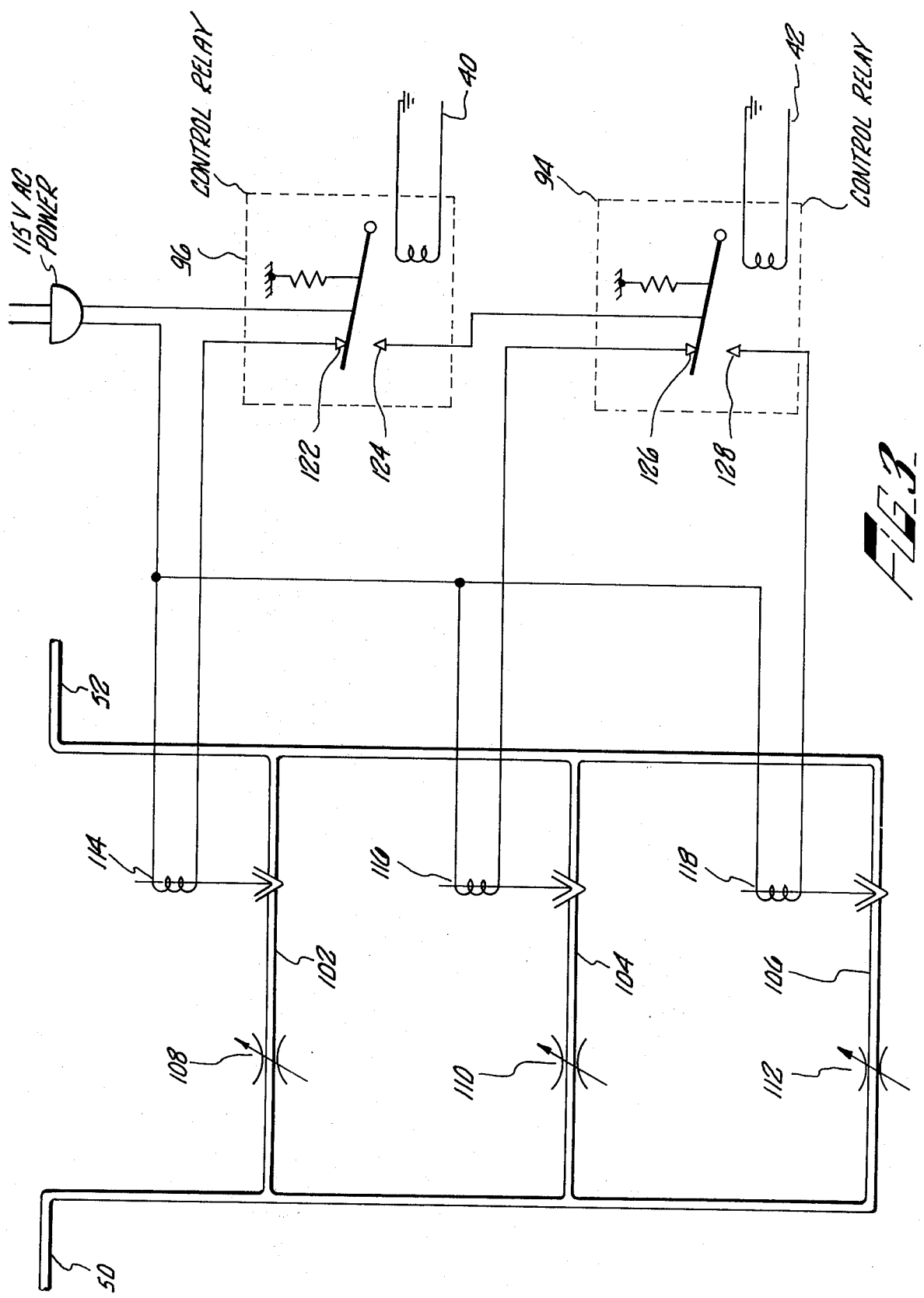
FIG. 3 is a schematic diagram showing the electrical and hydraulic components of the "control" subsystem of FIG. 1, which controls the rate of force application to the brakes in response to the signals from the signal subsystem.

In the embodiment of our control subsystem shown in FIG. 3, the rate of flow of hydraulic fluid between conduits 50 and 52 is controlled, or metered, by alternative orifices, or restrictions, which are selected by solenoid valves under the control of electrical relays.

Two electrical relays are shown in FIG. 3 at 94 and 96. Each of the relays used in the illustrated system is a two-position solenoid-energized device which, in effect, controls two switches. In its de-energized state, it is spring-biased to the position in which the first switch is closed and the second switch is open; and in its energized state, the solenoid overcomes the spring force and moves the relay to the position in which the first switch is open and the second switch is closed. In the disclosed embodiment, each relay is normally (when the system is inactive) in its de-energized position. As a practical embodiment, each relay may have a flexible armature which constitutes a common switch element movable to engage either of two electrical contacts.

Comparator 86 is connected by conductor 42 to relay 94; and comparator 88 is connected by conductor 40 to relay 96. Each comparator is designed to send an energizing signal to its relay only when the input rate of change signal E exceeds the reference signal F or G fed into that comparator. In other words, if the rate of brake effort change represented by signal E is less than the minimum reference signal G, neither relay will receive an output signal from its comparator, and both relays will remain in solenoid-de-energized position.

If signal E increases until it exceeds signal G but remains less than signal F, then relay 96 will receive an output signal from its comparator and will be energized, but relay 94 will remain de-energized.

If signal E continues to increase until it exceeds the maximum reference signal F, both relays will receive output signals from their comparators, and both relays will be at their energized positions.

As shown in FIG. 3, our control subsystem provides a metering control effect between hydraulic conduits 50 and 52 by using a plurality of parallel orifices, or restrictions, which have different sized openings for the flow of hydraulic fluid. By permitting flow through only one of the parallel orifices at a time, and by changing from one operative orifice to another in response to signals from the signal subsystem, the rate control system can automatically control the rate of increase of brake effort during the brake testing stroke with sufficient precision to obtain important functional advantages.

Three parallel hydraulic conduits are shown — 102, 104, and 106 — inserted in the hydraulic system between conduits 50 and 52. The three parallel conduits contain, respectively, a larger metering orifice, or restriction, 108; an intermediate sized metering orifice, or restriction, 110; and a smaller metering orifice, or restriction, 112.

Each conduit — 102, 104, and 106 — has a solenoid-controlled valve —114, 116, and 118, respectively — to open or close the conduit in response to electrical signals from the signal subsystem. Each of the valves 114, 116, and 118 is either fully open or fully closed; so that they have no metering effect on the hydraulic fluid. Only one of the three valves is open at a time; the other two are closed to cause the fluid to flow solely in one branch of the parallel hydraulic circuit. The solenoids shown are spring-biased to closed position, and are moved to open position whenever the solenoid circuit is completed to energize the solenoid coil.

Since different testing programs may necessitate different available combinations of orifice sizes, each of the orifices 108, 110, and 112 is provided with a suitable means for manual adjustment between tests. Commercially available valve units, both of the adjustable-orifice metering type, and of the solenoid-controlled "on-off" type, are shown and described in our copending application Ser. No. 563,329.

It is obvious that comparable results could be obtained by having only two parallel metering conduits, and using the combined open position of both conduits as the equivalent of the largest of the three metering orifices. One disadvantage of such an arrangement would be the absence of separate adjustability for the combined effective orifice size.

Referring now to the circuit logic which controls the solenoid valves, it is seen that the relay 96 in its de-energized position closes the switch 122 which energizes the solenoid of shut-off valve 114, thereby opening the valve to permit hydraulic flow through the larger metering orifice 108. This condition continues as long as the actual brake effort change signal E is less than the minimum brake effort change reference signal G. There is no signal output to either relay, and so both relays remain in their de-energized position, in which their switches are in the closed and open positions shown in the figure. Under these operating conditions, the actual brake effort should be allowed to increase rapidly; and this is permitted by the open condition of solenoid valve 114 associated with the larger metering orifice 108. The other two solenoid valves 116 and 118 are closed because their circuits are open due to the open position of switch 124 controlled by relay 96.

When the actual brake effort change signal F reaches a value which exceeds the minimum brake effort change reference signal G, but does not exceed the maximum brake effort change reference signal F, relay 96 will be energized while relay 94 remains de-energized. Energization of relay 96 causes switch 122 to open and switch 124 to close, thereby opening the circuit of solenoid valve 114 and closing the circuit of solenoid valve 116. Deenergization of the solenoid valve 114 causes that valve to close; and energization of the solenoid in valve 116 causes that valve to open. Hydraulic fluid flow now occurs only through the intermediate-sized metering orifice 110. In this condition, the rate of increase of brake effort is limited to a somewhat lower value than that permitted when the larger orifice 108 is open.

When the actual brake effort change signal E reaches a value which exceeds the maximum brake effort change reference signal F, relay 94 will be energized and relay 96 will remain energized. Energization of relay 94 causes switch 126 to open and switch 128 to close, thereby opening the circuit of solenoid valve 116 and closing the circuit of solenoid valve 118. Deenergization of the solenoid in valve 116 causes that valve to close; and energization of the solenoid in valve 118 causes that valve to open. The conduits 102 and 104 are now closed, and conduit 106 is open; so the only flow of hydraulic fluid is through the smaller metering orifice 112. In this condition, the rate of increase of brake effort is more severely limited to prevent too rapid a build up of brake effort.

If, during a brake application by the automatic testing system, the rate of brake effort increase drops to a lower value, the control logic can reverse to permit a greater rate of flow of hydraulic fluid, thereby allowing a faster rate of brake effort increase.

The rate control system just described provides a means of obtaining improved brake analyzer results because the closed loop, of feedback, aspects of the system permit the widely different braking systems of different vehicles to be subjected to a reasonably consistent brake effort build up rate. This is an important consideration, for the reasons enumerated in the discussion of the background of the invention.

Figure 4:
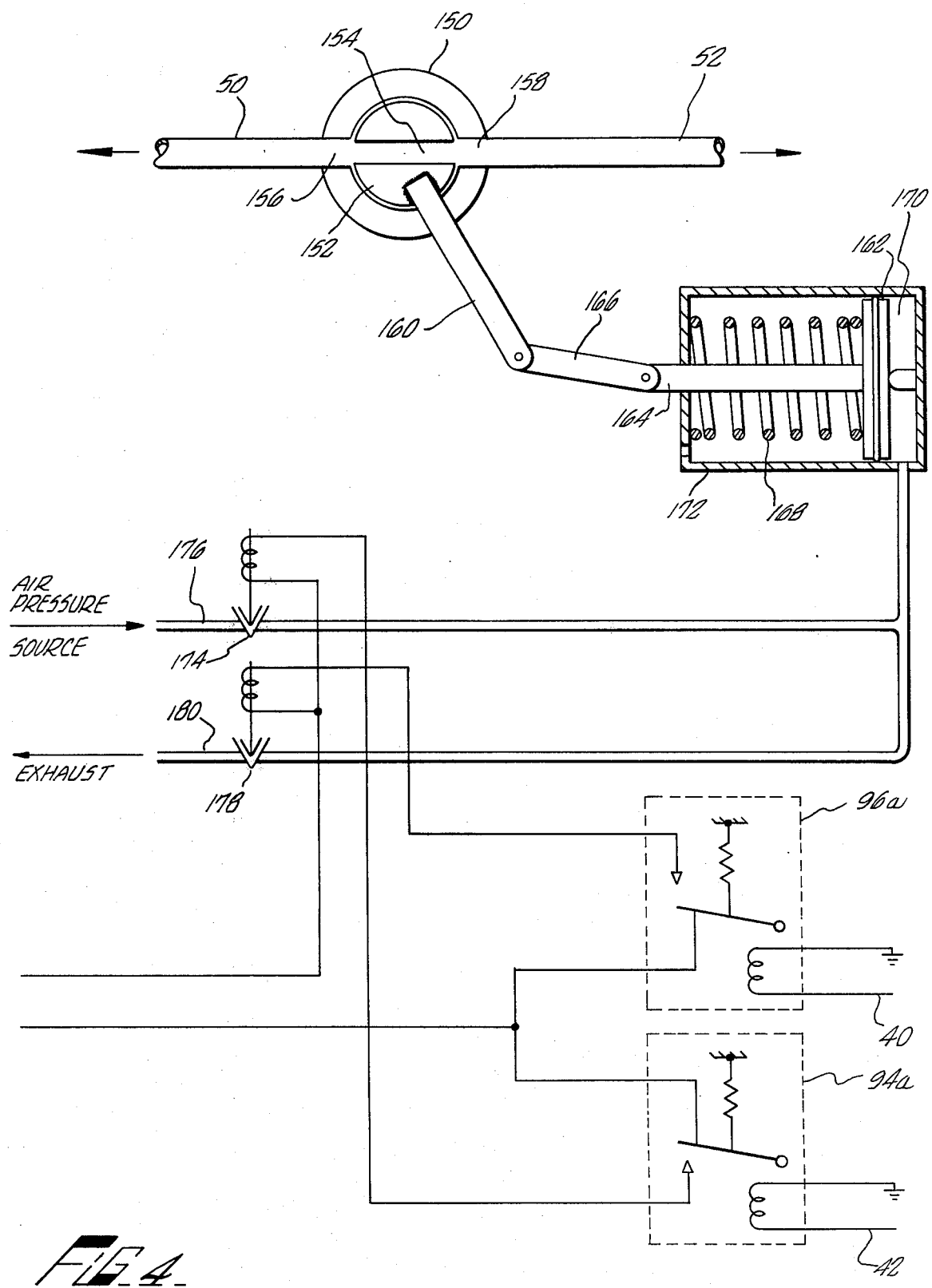
FIG. 4 is a schematic diagram showing a modified version of the "control subsystem" shown in FIG. 3.

FIG. 4 illustrates a modified version of the invention in which the parallel hydraulic circuitry shown in FIG. 3 as the means for controlling the hydraulic flow rate is replaced by a single valve which is movable to vary the size of the fluid metering passage. A potentially ideal arrangement would be a metering valve having progressively variable orifice sizes responsive directly to variations in an electrical signal, so that the size of the metering orifice would be proportional to the magnitude of the controlling signal. Such an arrangement could be controlled by a single signal representing the deviation of the instantaneous actual brake effort rate of change from the desired brake effort rate of change.

The control subsystem shown in FIG. 4 is a more complex arrangement, but it has the attributes of (a) utilizing relatively inexpensive components, and (b) being operable by the same signal subsystem which actuates the control subsystem of FIG. 3.

As shown in FIG. 4, two relay valves 94a and 96a are used, which receive signals from the comparators 86 and 88 via conductors 42 and 40 constituting the same signal outputs as those already discussed in connection with FIG. 2.

In FIG. 4, the metering of hydraulic fluid between conduits 50 and 52 is accomplished by a rotary valve having a casing 150 and a rotary valve element 152. The rotary valve element has a diametral passage 154 which controls communications between the inlet port 156 and the outlet port 158 provided in the valve casing. A valve operating arm 160 is secured to the valve element 152 to control rotation of the valve element in response to reciprocal movements of a piston 162 connected to the arm 160 by suitable means, such as a rod 164 and link 166.

The piston 162 is arranged to be positioned by the opposed forces of a spring 168 tending to move it to the right (in the figure) and of a controlled pressure from a suitable pressure source which acts against the right surface of the piston tending to move it to the left. In the illustrated embodiment, the pressure is supplied from an air pressure source, not shown.

The air pressure in chamber 170, formed between the right surface of the piston 162 and its cylindrical housing 172, is controlled by an inlet valve 174 in a conduit 176 connecting to the pressure source, and by an exhaust valve 178 in the exhaust conduit 180. Chamber 170 needs to be large enough, and the conduits, or hoses, leading to the inlet and exhaust valves need to be large enough, to "cushion" changes in the air pressure so that adjustment in the position of the rotary valve element 152 will not be too abrupt.

Each of the valves 174 and 178 is shown as solenoid controlled. Both valves are normally closed by their springs, and are opened when their respective solenoids are energized. As shown in the relay and solenoid logic diagram in the figure, the relay 94a controls the solenoid of the inlet valve 174, and the relay 96a controls the solenoid of the inlet valve 178. In this version of the control subsystem, the relays 94a and 96a each control a single switch. Both relays are in their de-energized positions when the actual brake effort change signal E is lower than the minimum reference brake effort change signal G. In its de-energized position relay 94a opens the circuit of the solenoid of inlet valve 174, thereby causing the inlet valve to remain in its normally closed position. Relay 96a, in its de-energized position, closes the circuit of the solenoid of exhaust valve 178, thereby causing the exhaust valve to open. All the air pressure is exhausted from chamber 170, and spring 168 therefore holds piston 162 in its retracted position, as shown in the figure. In this position of the piston 162, valve element 152 permits maximum hydraulic flow between conduits 50 and 52.

When the rate of change of brake effort E increases until it exceeds the minimum limit G, relay 96a will energize, thereby causing the circuit of the exhaust valve solenoid to open. No more air pressure will exhaust from the chamber 170.

If the rate of change of brake effort E continues to increase until it exceeds the maximum limit F, relay 94a will energize, thereby causing the circuit of the inlet valve solenoid to close. The inlet solenoid will open the inlet valve 174, permitting air under pressure to enter the chamber 170. This pressure increase will move piston 162 to the left against the force of spring 168, thereby causing the rotary valve element 152 to move in a clockwise direction. The valve element motion will reduce the size of the effective passage for hydraulic fluid through the valve, and will thus limit the rate of movement of the brake actuating piston 54, so the build up rate of brake effort is reduced.

When the rate of change of brake effort E drops below the maximum limit F, the relay 94a will de-energize, causing the circuit of the inlet solenoid to open, and permitting its spring to close inlet valve 174. This will stabilize the position of piston 162 and of rotary valve element 152, maintaining the same size of the hydraulic flow passage.

If, subsequently, during the brake application, the rate of change of brake effort E should drop below the minimum limit G, the relay 96a would de-energize, causing the circuit of the exhaust solenoid to close. This would open the exhaust valve 178 and permit a reduction in pressure in chamber 170, allowing spring 168 to move valve element 152 in a counterclockwise direction to enlarge the size of the hydraulic flow passage.

There are several possible variations of the control subsystem of FIG. 4. For example, a DC motor having a gear reduction to produce a slow shaft speed could be used to control the position of the rotary valve element. Reversal of polarity of the motor would reverse the direction of rotation of its shaft, thereby permitting it to move the valve element either clockwise or counterclockwise. Limit switches could be used to stop the motor whenever the valve reached either a fully open position or a fully closed position.

As explained heretofore, the purpose of this invention is accomplished by providing a closed loop, or feedback, system which uses brake effort rate of change signals to cause variations in the rate at which brake application build up is permitted, thereby maintaining the desired value, or range of values, of the brake effort increase rate during the test application of the vehicle brakes. This system compensates automatically for the wide variations in the braking systems of vehicles subjected to brake tests. It will be apparent that numerous modifications of the disclosed embodiments may be made without departing from the scope and intent of our invention.

What is claimed is:

1. A rate control system, for a brake testing apparatus which applies actuating force to a brake, comprising:
    signal means for generating a signal representing the rate of change of brake effort at the brake;
    means for comparing that signal with a desired value; and control means responsive to divergencies between the signal and the desired value for causing a variation in the rate of brake application.

2. The rate control system of claim 1 wherein the signal means comprises:
   a force transducer which converts varying brake effort values into a varying voltage signal; and
   a differentiator which converts the varying voltage signal into a brake effort rate of change signal.

3. The rate control system of claim 1 wherein the comparing means comprises:
   means for comparing the brake effort rate of change signal with a minimum limit value; and
   means for comparing the brake effort rate of change signal with a maximum limit value.

4. The rate control system of claim 3 wherein the control means comprises:
   a variable fluid flow metering device; and
   electrically operated valve means for controlling the fluid flow metering device in response to electrical signals from the comparing means.

5. The rate control system of claim 4 wherein the fluid flow metering device comprises a plurality of selectively functioning different-sized metering orifices.

6. The rate control system of claim 5 wherein the size of each metering orifice is separately adjustable by the operator of the brake testing apparatus.

7. The rate control system of claim 4 wherein the fluid flow metering device consists essentially of a movable valve element which varies the size of a single metering orifice.

8. In a vehicle testing system having a power actuator for applying force to move the vehicle brake pedal, a hydraulic subsystem in which hydraulic fluid is moved by the power actuator as it moves the brake pedal, and means for measuring separately the brake effort developed at the left and right wheel brakes of the vehicle; means for controlling the brake applying stroke of the power actuator comprising:
   first signal-developing means for indicating the rate of increase of the left wheel brake effort;
   second signal-developing means for indicating the rate of increase of the right wheel brake effort;
   means for comparing the signals of the first and second signal-developing means and selecting the signal which indicates the faster rate of increase;
   means for comparing the selected faster signal with upper and lower predetermined rate-of-increase values;
   valve means in the hydraulic subsystem for increasing or decreasing the rate of flow of hydraulic fluid permitted in the subsystem; and
   means for causing the valve means to decrease the rate-of-flow if the rate of brake effort increase is more than the predetermined upper rate of increase or increase the rate-of-flow if the rate of increase is less than the predetermined lower rate of increase.

9. In a vehicle testing system wherein automatically controlled force moves the vehicle brake pedal, wherein hydraulic fluid is displaced during such movement, and wherein means are provided for measuring separately the brake effort developed at the left and right wheel brakes of the vehicle; means for controlling the brake applying stroke of the pedal comprising:
   first signal-developing means for indicating the rate of increase of the left wheel brake effort;
   second signal-developing means for indicating the rate of increase of the right wheel brake effort;
   means for comparing the signals of the first and second signal-developing means and selecting the signal which indicates the faster rate of increase;
   means for comparing the selected faster signal with upper and lower predetermined rate-of-increase values;
   valve means for increasing or decreasing the rate of flow of hydraulic fluid permitted; and
   means for causing the valve means to decrease the rate-of-flow if the rate of brake effort increase is more than the predetermined upper rate of increase or increase the rate-of-flow if the rate of increase is less than the predetermined lower rate of increase.

10. The rate control system of claim 9 wherein the valve means comprises a plurality of selectively-functioning different-sized metering orifices.

11. The rate control system of claim 9 wherein the valve means consists essentially of a movable valve element which varies the size of a single metering orifice.

12. In a vehicle testing system having a power actuator for applying force to move the vehicle brake pedal, a hydraulic subsystem in which hydraulic fluid is moved by the power actuator as it moves the brake pedal, and means for measuring separately the brake effort developed at the left and right wheel brakes of the vehicle; means for controlling the brake applying stroke of the power actuator comprising:
   first signal-developing means for indicating the rate of increase of the left wheel brake effort;
   second signal-developing means for indicating the rate of increase of the right wheel brake effort;
   means for comparing the signals of the first and second signal-developing means and selecting the signal which indicates the faster rate of increase;
   means for comparing the selected faster signal with a predetermined rate-of-increase value;
   valve means in the hydraulic subsystem for increasing or decreasing the rate of flow of hydraulic fluid permitted in the subsystem; and
   means for causing the valve means to decrease the rate-of-flow if the rate of brake effort increase is more than the predetermined rate of increase or increase the rate-of-flow if the rate of increase is less than the predetermined rate of increase.

13. In a vehicle testing system wherein automatically controlled force moves the vehicle brake pedal, wherein hydraulic fluid is displaced during such movement, and wherein means are provided for measuring separately the brake effort developed at the left and right wheel brakes of the vehicle; means for controlling the brake applying stroke of the pedal comprising:
   first signal-developing means for indicating the rate of increase of the left wheel brake effort;
   second signal-developing means for indicating the rate of increase of the right wheel brake effort;
   means for comparing the signals of the first and second signal-developing means and selecting the signal which indicates the faster rate of increase;
   means for comparing the selected faster signal with a predetermined rate-of-increase value;
   valve means for increasing or decreasing the rate of flow of hydraulic fluid permitted; and
   means for causing the valve means to decrease the rate-of-flow if the rate of brake effort increase is more than the predetermined rate of increase or increase the rate-of-flow if the rate of increase is less than the predetermined rate of increase.

14. In a vehicle brake testing system wherein a brake actuator automatically applies the brakes and wherein means are provided for measuring separately the brake effort developed at the left and right wheel brakes of the vehicle; means for controlling the brake actuator comprising:

first signal-developing means for indicating the rate of increase of the left wheel brake effort;

second signal-developing means for indicating the rate of increase of the right wheel brake effort;

means for comparing the signals of the first and second signal-developing means and selecting the signal which indicates the faster rate of increase;

means for comparing the selected faster signal with upper and lower predetermined rate-of-increase values; and means for decreasing the rate of brake application if the rate of brake effort increase is more than the predetermined upper rate of increase and increasing the rate of brake application if the rate of brake effort increase is less than the predetermined lower rate-of-increase.

15. In a vehicle brake testing system having a power actuator for applying the vehicle brakes, the combination which comprises:

means for measuring the rate of change of brake effort of the left and right wheel brakes;

means for comparing the rate of change of the brake effort for at least one of the left and right wheel brakes with upper and lower predetermined rate-of-increase values; and means for controlling the power actuator to decrease the rate of brake application if the rate of brake effort increase is more than the predetermined upper rate-of-increase and to increase the rate of brake application if the rate of brake effort increase is less than the predetermined lower rate of increase.

* * * * *